(12) United States Patent
Lu et al.

(10) Patent No.: US 11,263,379 B2
(45) Date of Patent: Mar. 1, 2022

(54) HIERARCHICAL CLOCK TREE IMPLEMENTATION

(71) Applicant: Samsung Electronics Co., Ltd., Suwon-si (KR)

(72) Inventors: Hongda Lu, Austin, TX (US); Sridhar Subramaniam, San Jose, CA (US); Kok-Hoong Chiu, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/666,389

(22) Filed: Oct. 28, 2019

(65) Prior Publication Data

US 2020/0401673 A1    Dec. 24, 2020

Related U.S. Application Data

(60) Provisional application No. 62/863,259, filed on Jun. 18, 2019.

(51) Int. Cl.
   *G06F 30/394*     (2020.01)
   *G06F 119/12*     (2020.01)

(52) U.S. Cl.
   CPC ........ *G06F 30/394* (2020.01); *G06F 2119/12* (2020.01)

(58) Field of Classification Search
   USPC .......................................................... 716/113
   See application file for complete search history.

(56) References Cited

U.S. PATENT DOCUMENTS

| | | | |
|---|---|---|---|
| 6,751,786 B2 | 6/2004 | Teng et al. | |
| 7,017,132 B2 | 3/2006 | Hou et al. | |
| 7,467,367 B1 | 12/2008 | Li et al. | |
| 7,669,160 B2 | 2/2010 | Furnish et al. | |
| 8,356,264 B2 | 1/2013 | Lasher et al. | |
| 8,719,743 B1 | 5/2014 | Kollaritsch et al. | |
| 9,058,451 B2 | 6/2015 | Lin et al. | |
| 2005/0102643 A1* | 5/2005 | Hou .......................... | G06F 1/10 716/104 |
| 2006/0069539 A1* | 3/2006 | Takaba .................... | G06F 30/33 703/19 |
| 2009/0217225 A1* | 8/2009 | Sunder ................ | G06F 30/3312 716/113 |
| 2014/0189627 A1* | 7/2014 | Dhar ....................... | G06F 30/30 716/114 |

* cited by examiner

*Primary Examiner* — Mohammed Alam
(74) *Attorney, Agent, or Firm* — Renaissance IP Law Group LLP

(57) ABSTRACT

A method of constructing a hierarchical clock tree for an integrated circuit may include constructing a clock distribution network on a first level, pushing the clock distribution network to a second level, implementing partition clock trees in partitions on the second level, and calculating combined timing of the clock distribution network and the partition clock trees on the second level. Implementing the partition clock trees may include constructing the partition clock trees in the partitions on the second level, calculating trial timing for the partition clock trees, calculating target timing constraints for the partition clock trees based on timing of the clock distribution network and the trial timing for the partition clock trees, and adjusting the timing of one or more of the partition clock trees based on the target constraints.

9 Claims, 10 Drawing Sheets

HIERARCHICAL CLOCK TREE IMPLEMENTATION

This application claims priority to, and the benefit of, U.S. Provisional Patent Application Ser. No. 62/863,259 titled "Method And Apparatus For Hierarchical Clock Implementation For Abutted Design" filed Jun. 18, 2019 which is incorporated by reference.

BACKGROUND

1. Field

This disclosure relates generally to clock trees for integrated circuits, and more specifically to hierarchical clock tree implementation.

2. Related Art

Hierarchical design is widely used in very large scale integration (VLSI) to design highly complex integrated circuits (ICs). Hierarchical design generally involves breaking a complex design into smaller physical blocks which may be easier to design individually, and then combining the blocks into a larger overall design. The blocks in hierarchical design are generally arranged in either a channel-based design or an abutted design. In a channel-based design, the blocks are separated by channels through which clock and other signals are distributed to the blocks. In abutted or channel-less design, the blocks are placed next to each other with no space between them.

Clock trees are used to distribute clock signals throughout integrated circuits. Clock trees are designed through a process that seeks to minimize latency, which is the delay from a root clock to a point of usage, and skew, which is the difference between the arrival time of a clock transition at different points on the integrated circuit. During the design process, many parameters of a clock tree are typically adjusted through multiple iterations to meet the timing requirements and constraints for the clock tree. When the goals for the timing requirements and constraints have been satisfied, the design is said to have achieved timing closure. VLSI design is performed on industry standard electronic design automation (EDA) tools which typically have automated workflows for many of the routine tasks performed by a designer. However, industry standard EDA tools do not have methodologies or workflows for efficient hierarchical clock implementation, especially for abutted designs.

SUMMARY

A method of constructing a hierarchical clock tree for an integrated circuit may include constructing a clock distribution network on a first level, pushing the clock distribution network to a second level, implementing partition clock trees in partitions on the second level, and calculating combined timing of the clock distribution network and the partition clock trees on the second level. Implementing the partition clock trees may include constructing the partition clock trees in the partitions on the second level, calculating trial timing for the partition clock trees, calculating target timing constraints for the partition clock trees based on timing of the clock distribution network and the trial timing for the partition clock trees, and adjusting the timing of one or more of the partition clock trees based on the target constraints. Calculating the combined timing of the clock distribution network and the partition clock trees on the second level may include merging the partition clock trees. The method may further include adjusting the timing of one or more of the partition clock trees on the second level. The timing of one or more of the partition clock trees on the second level may be adjusted through engineering change orders (ECO). The timing of one or more of the partition clock trees may be adjusted by adjusting one or more target constraints for the one or more of the partition clock trees on the second level. The method may further include determining that timing goals are not met by adjusting the timing of one or more of the partition clock trees, and/or adjusting the clock tree distribution network. The method may further include balancing the clock distribution network in parallel with balancing one or more of the partition clock trees. The method may further include pushing the clock distribution network to a third level, and implementing partition clock trees in partitions on the third level. The clock distribution network may be pushed into one or more of the partitions on the second level. The second level may include a block level. The second level may be lower than the first level.

A method of constructing a hierarchical clock tree for an integrated circuit may include constructing a clock distribution network at a first level, pushing the clock distribution network to partitions at a second level, calculating trial timing for the partitions at the second level, calculating combined timing of the clock distribution network and the trial timing for the partitions at the second level, calculating partition-level target constraints based on the combined timing of the clock distribution network and the trial timing for the partitions at the second level, and calculating revised timing at the partition level based on the target constraints. The method may further include merging the partitions at the partition level, calculating revised combined timing of the clock distribution network and the revised timing for the partitions at the second level, and checking if the revised combined timing meets design goals. The method may further include balancing the hierarchical clock tree by adjusting the revised timing for the partitions at the second level. The timing at the second level may be adjusted through engineering change orders (EGO). The timing at the second level may be adjusted by adjusting the target constraints at the second level. The timing may include latency. The timing may include skew. The partitions may include abutted blocks. The second level may include channel-based blocks. The partitions may include multiple instantiated modules (MIMs). A dependency between the clock distribution network and the partitions on the second level may be decoupled. The method may further include balancing the clock distribution network and the partitions at the second level in parallel.

A method of constructing a clock tree for an integrated circuit may include constructing a top-level clock distribution network, calculating distribution delays to endpoints of the clock distribution network, pushing the top-level clock distribution network down to a block level, constructing clock trees in blocks at the endpoints, calculating block-level insertion delays for the clock trees in blocks at the endpoints, combining the distribution delays with the block-level insertion delays to calculate clock tree insertion delays from a root of the top-level clock distribution network, calculating delay target constraints for the blocks based on the clock tree insertion delays from the root of the top-level clock distribution network, re-calculating block-level insertion delays based on the delay target constraints, merging the clock trees at the block level, and re-calculating the clock tree insertion delays from the root of the top-level clock distribution network. The method may further include checking if the re-calculated clock tree insertion delays from the root of the top-level clock distribution network meet design goals.

The method may further include determining that the insertion delays from the root of the top-level clock distribution network do not meet design goals, and changing clock cells on the clock tree using engineering change orders (EGO). The method may further include determining that the insertion delays from the root of the top-level clock distribution network do not meet design goals, and re-calculating the delay target constraints for the blocks. Pushing the top-level clock distribution network down to the block level may include creating ECO files for sub-blocks. Pushing the top-level clock distribution network down to the block level may include creating configuration files for sub-blocks. The method may further include determining that a sub-block floorplan changed to push the top-level clock distribution network down to a block level, and modifying the top-level clock distribution network structure at the block level to preserve the distribution delays to endpoints of the clock distribution network.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Figure 1:
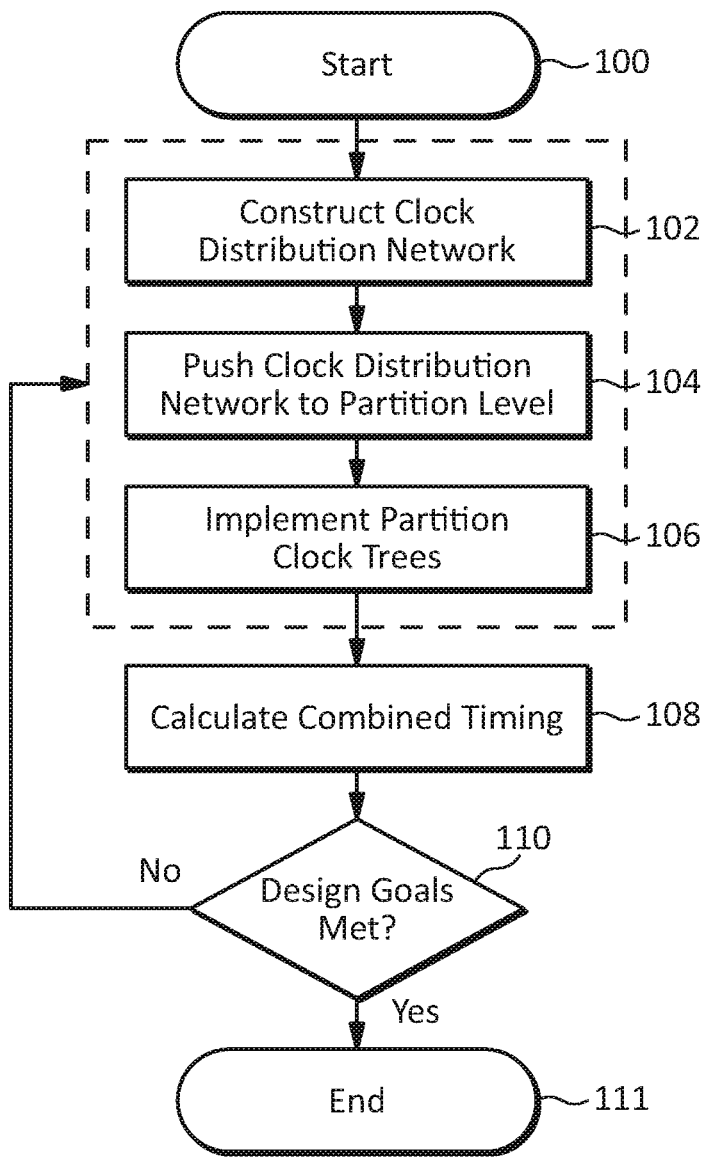
FIG. 1 is a flow chart illustrating an embodiment of a method for constructing a hierarchical clock tree for an integrated circuit according to this disclosure.

In hierarchical designs, clock trees may be divided into top-level global or distribution portions, which transmit the clock signal to different blocks or parts of the integrated circuit, and block-level or local portions which spread the clock signals to the individual sequential cells that use the clock signals. To design a clock hierarchy for a channel-based design, block-level clock trees may be designed for each block, typically using clock tree synthesis (CTS). Once the block-level clock trees are ready, the designer may create a top-level clock distribution network, typically in the channels between blocks, based on the clock tree insertion delay of each block and/or subblock. Because the top-level clock tree placement, routing and balance work may have to wait until the clock trees for all blocks and/or subblocks are completed, this process may result in slower timing closure. Moreover, channel-based floorplans are typically less efficient in terms of space (die area) and power consumption than abutted designs.

Although abutted hierarchical designs are typically more efficient than channel-based designs, designing clock distribution networks for abutted designs may be considerably more challenging. For example, a top-level clock distribution network may need to be planned and/or designed at the block level which may require piecing together the clock distribution network with individual blocks which may not provide a good view of the overall clock distribution network. Also, the insertion delays for clock trees in different blocks or subblocks may vary because of differences in the sizes of the blocks and/or subblocks and/or the number of clock leaf cells. Additionally, even for the same block, a designer may see different clock tree insertion delays for different runs because of different clock leaf cell placement. This may result in the need for many design iterations to balance the clock distribution network and block-level trees, thereby increasing the time required to achieve timing closure. Thus, for top-level clock trees, CTS may not work for abutted designs. Moreover, industry standard tools do not have the ability to push down clock trees hierarchically to facilitate faster timing closure. As a result, only channel-based designs may be created using industry standard tools which may result in increased die area and greater power consumption.

Most high frequency abutted designs typically use a clock mesh structure which may be implemented as grids of metal traces driven by many clock drivers. Clock mesh structures may typically achieve better skew and latency, but they may also typically consume more power and/or die area as well. Power consumption in a clock mesh design may be driven by the extra capacitance of the mesh structure, as well as clock gaters being pushed toward leaf cells which may lead to less efficient clock gating. Moreover, clock mesh design and workflow may be more complicated and time consuming than clock tree synthesis. For example clock mesh design may involve extensive SPICE simulation, timing back annotation, and turn over time.

Figure 2:
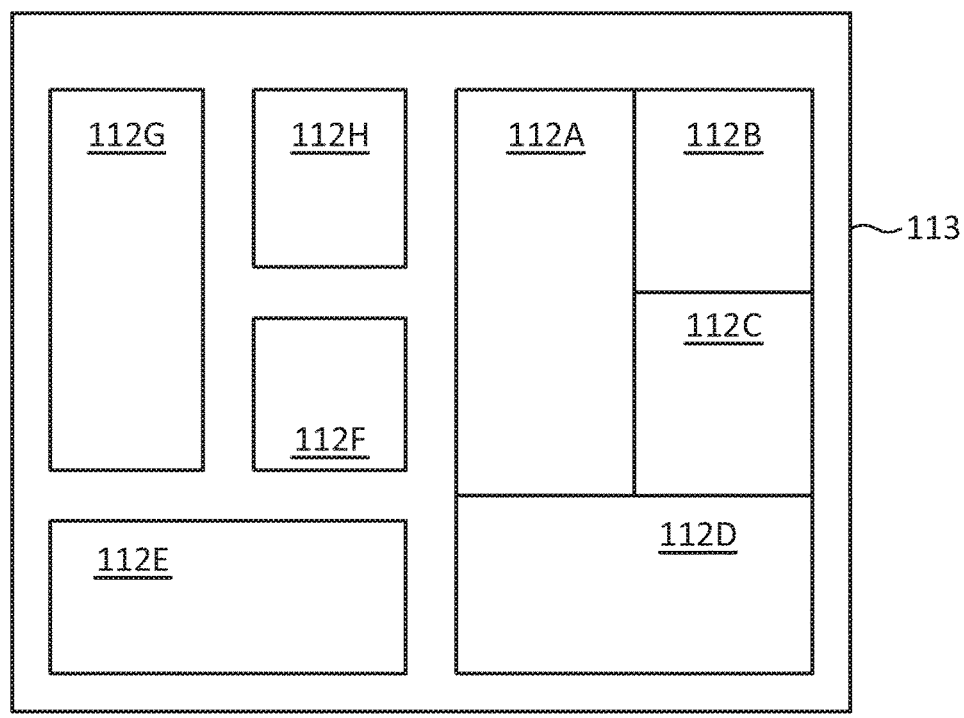
FIG. 2 is a plan view illustrating blocks arranged on an integrated circuit for use with an embodiment of a method for constructing a hierarchical clock tree for an integrated circuit according to this disclosure.

FIG. 1 illustrates an embodiment of a method for constructing a hierarchical clock tree for an integrated circuit according to this disclosure. The method begins at step 100 with a partition-level floorplan as shown in FIG. 2 which illustrates various physical partitions as they may be arranged on an integrated circuit (IC) 113 or portion thereof. In the embodiment of FIG. 2, partitions 112A, 112B, 112C and 112D are arranged in an abutted design, while partitions 112E, 112F, 112G and 112H are arranged in a channel-based design. The partitions may be implemented, for example, as blocks, subblocks, modules, tiles, etc.

Figure 3:
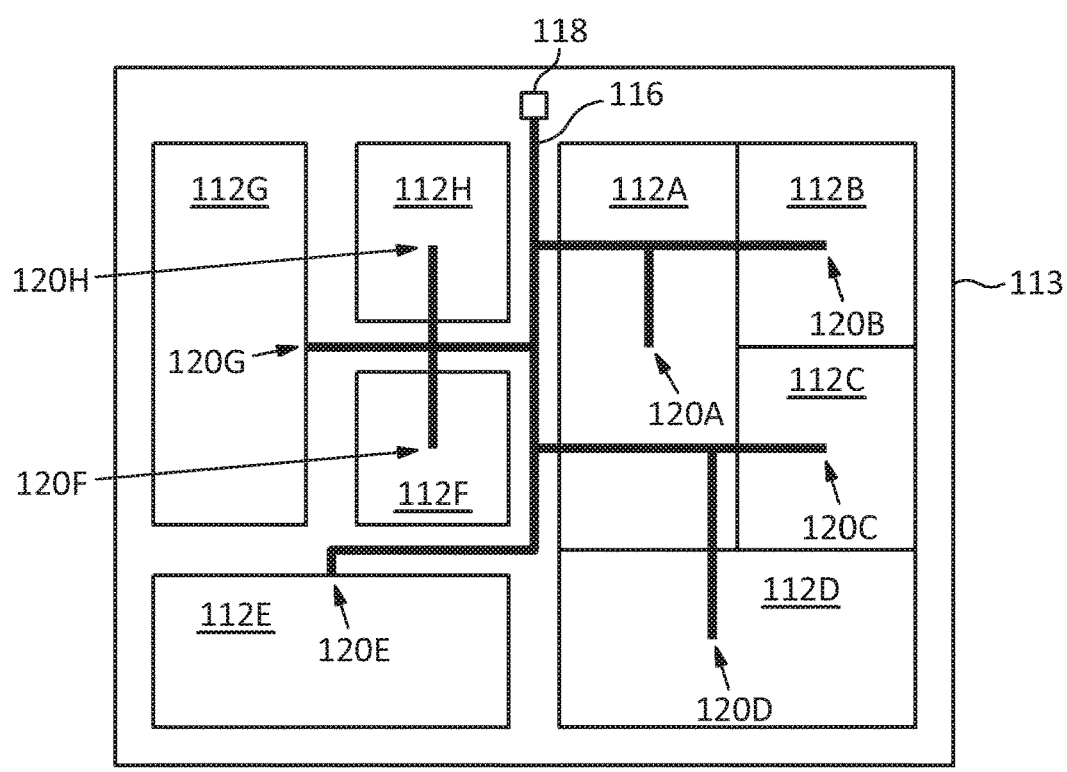
FIG. 3 is a plan view illustrating an embodiment of a clock distribution network constructed according to an embodiment of a method for constructing a hierarchical clock tree for an integrated circuit according to this disclosure.

At step 102 of FIG. 1, a clock distribution network 116 may be constructed as shown in FIG. 3 on another level that may be, for example, above the partition level. The clock distribution network 116 may distribute a clock signal from a clock source or root 118 to endpoints 120A, 120B, 120C, 120D, 120E, 120F, 120G, and 120H, which may be referred to collectively as 120. For simplicity of illustration, only the wiring of the clock distribution network 116 is shown, but it may also include buffers, gates and any other clock cells located at suitable points in the network.

At step 104 of FIG. 1, the clock distribution network 116 may then be pushed, in this case down, to the partition level. In the portions of the floorplan having the abutted partitions 112A, 112B, 112C and 112D, the clock distribution network 116 may be pushed into the abutted partitions. In the portions of the floorplan having channel-based partitions 112E, 112F, 112G and 112H, the clock distribution network 116 is mostly pushed into the channels between the partitions, with endpoints being positioned at the edges of the partitions. However, in some instances, for example with partitions 112F and 112H, some endpoints and segments of the clock distribution network 116 may be pushed down into the partitions.

Figure 4:
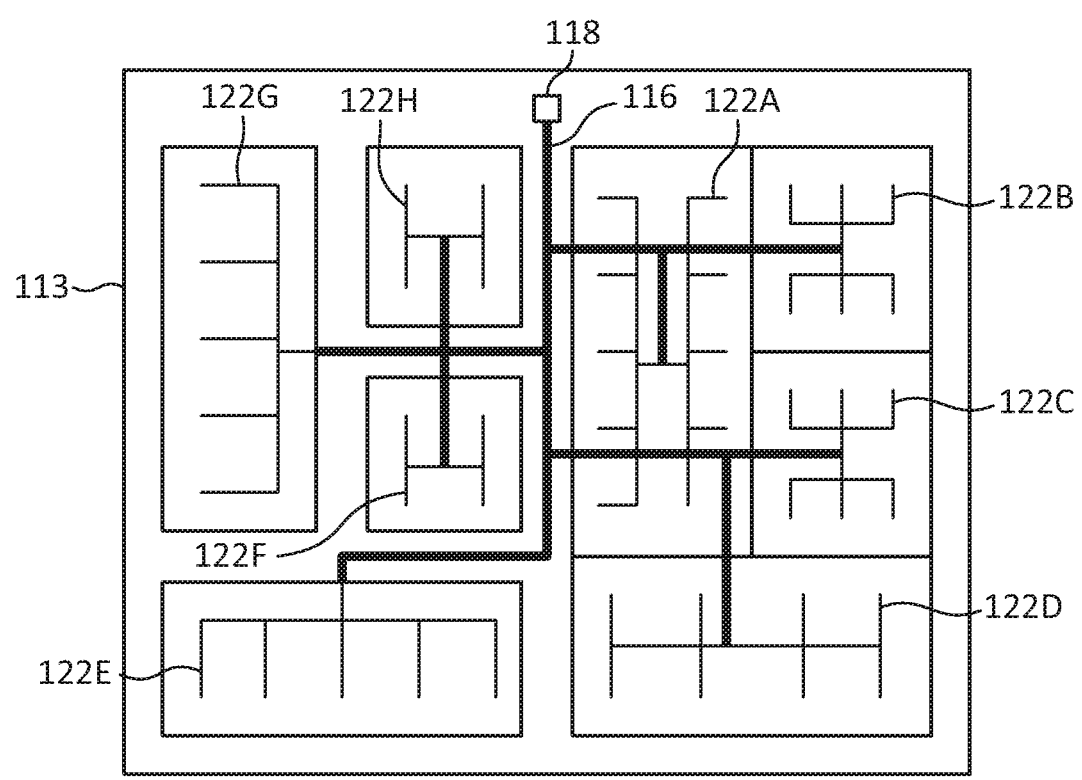
FIG. 4 is a plan view illustrating an embodiment of a clock distribution network pushed to another level and partition clock trees constructed according to an embodiment of a method for constructing a hierarchical clock tree for an integrated circuit according to this disclosure.

At step 106 of FIG. 1, partition clock trees 122A-122H may be implemented within the partitions 112A-112H as shown in FIG. 4. The endpoints 120 of the clock distribution network 116 may serve as roots for the partition clock trees 122A-122H, which may be referred to collectively as 122. In some embodiments, the partition clock trees 122 may be implemented by constructing partition clock trees and calculating clock timing for the partition clock trees. In other embodiments, the partition clock trees 122 may be implemented by calculating trial timing and constraints at the partition level, and through various additional techniques according to the principles of this disclosure as described in more detail below. For simplicity of illustration, only the wiring of the partition clock trees 122 are shown, but they may also include buffers, gates and any other clock cells located at suitable points in the trees.

Thus, a hierarchical clock tree may be constructed beginning from a clock root 118 and running through the clock distribution network 116, the endpoints 120, and the partition clock trees 122.

At step 108 of FIG. 1 after the hierarchical clock tree has been constructed as described above, the timing of the clock distribution network 116 may be combined with the timing of the partition clock trees 122 to calculate the overall hierarchical clock tree timing beginning at the clock root 118. In this context, timing may refer to any clock-related timing parameter such as, for example, latency (or insertion delay) and skew. Moreover, any timing parameter may be evaluated at one or more corners including any or all relevant process, voltage and temperature (PVT) corners. At step 110 of FIG. 1, the overall hierarchical clock tree timing may then be checked to see if it meets design goals. If not, adjustments may be made at the clock distribution level and/or the partition level by returning to any of steps 102, 104 and 106. If the overall hierarchical clock tree timing meets design goals, the method may end at step 111. All or any portion of the overall hierarchical clock tree, including routes, buffers and/or clock cells may then be preserved, for example, by locking them down to prevent EDA tools from modifying all or any portion of the overall hierarchical clock tree during implementation of the partitions.

The methods and structures described above with respect to FIGS. 1-4 may enable a wide range of benefits, applications and additional features and techniques according to the principles of this disclosure. For example, a clock tree designer may be provided with a full-chip and/or multi-level view of clock tree planning which may allow for tighter control and/or improved flexibility in clock distribution and implementation. As another example, a non-mesh hierarchical clock tree may be implemented in an abutted design. The methods and structures described above may also enable the designer to implement a clock distribution network manually, independent of the EDA tools used, in a manner that may result in faster timing closure. They may also work with both abutted and channel-based design, and accommodate multiple-instance partitions such as multiple-instantiated-modules (MIMs) and multiple-instantiated-blocks (MIBs). The methods and structures described above may also decouple the dependency between the clock distribution network and partition clock trees, thereby enabling additional novel techniques. For example, depending on the implementation details and specific circumstances, with the dependencies decoupled between levels, the clock distribution network may not need to be balanced, and balancing may be accomplished through budgeting and/or adjustment via constraints at the partition level. This, in turn may result in minimizing or reducing latency at the clock distribution network. As another example, decoupling dependencies between the clock distribution network and the partition-level clock trees may enable balance work to be performed in parallel on the clock distribution network and the partition-level clock trees, for example, once latency budgeting is completed. Any or all of the benefits, applications, features, and techniques described above may lead to faster timing closure of the individual components and/or the overall hierarchical clock tree, as well as lower power consumption and smaller design area.

The inventive principles of this patent disclosure are not limited to the details illustrated in FIGS. 1-4. For example, the clock distribution network 116 and partition clock trees 122 are shown having simple tree structures as may be implemented with clock tree synthesis (CTS) and with single clock roots. However, multiple clocks roots and trees, and other topologies and arrangements may be used such as multisource CTS (MSCTS), mesh structures, or any hybrid combination thereof. The embodiment illustrated with respect to FIGS. 1-4 may be implemented as an entire integrated circuit (IC), or only a portion of an IC. It may also be implemented as a portion of a larger hierarchical clock tree. Moreover, other embodiments may be implemented in which all or a portion of the clock distribution network 116 may be pushed more than one level.

FIGS. 5 through 9 illustrate a more detailed example embodiment of a method for constructing a hierarchical clock tree for an integrated circuit according to this disclosure. For purposes of illustration, this embodiment is described in the context of a full chip design in which the clock distribution network may be designed at a top level and the partition level may have abutted blocks. However, the principles of this disclosure are not limited to these or any of the other example implementation details.

As an introductory overview, and as described in more detail below, a designer may start with a floorplan having abutted blocks that have been placed during physical design. The clock designer may plan and construct a top-level clock distribution network to distribute a clock signal from a top-level root clock to the individual blocks. The insertion delay from the root clock to the endpoints of the clock distribution network at each block may be calculated or measured. Once the top-level clock distribution network meets top-level clock timing goals such a latency and/or skew, the top-level clock distribution network may be pushed down into blocks and/or subblocks at the block level. Since the block-level clock timing for different blocks and/or subblocks may be different, a trial clock timing such as latency and/or skew may be calculated for each of the blocks and/or subblocks using, for example, clock tree synthesis (CTS). Using insertion delay as an example, the trial insertion delay for each block or subblock may be added to the insertion delay of the top-level clock distribution network to the endpoint at that block, thereby determining an overall trial latency for each block or subblock starting at the top-level clock root. This may be repeated for any or all of the blocks to determine the block or subblock having the longest overall trial latency. The overall trial latency for each of the other blocks or subblocks may be subtracted from the longest overall trial latency to calculate a result that may be used as a target latency constraint for each other block or subblock. The CTS may be run again for each block or subblock using the target latency constraints to calculate new or revised latencies for each other block or subblock. The blocks and/or subblocks may then be merged to create an entire hierarchical clock tree. The re-calculated latencies for each block or subblock may then be added to the insertion delay of the top-level clock distribution network to the endpoint at that block, thereby determining a new or revised overall latency for each block or subblock. If the new or revised overall latencies meet design goals, the hierarchical clock tree is considered balanced. If not, the block level clock timing may be adjusted through engineering change orders (ECOs) and re-merging the blocks, or by adjusting the constraints for one or more of the blocks or subblocks and re-running the CTS. If the hierarchical clock tree is not balanced through ECOs or adjusting constraints, the top-level clock distribution network may be re-planned and/or re-constructed and the trial timing process may be repeated.

Figure 5A:
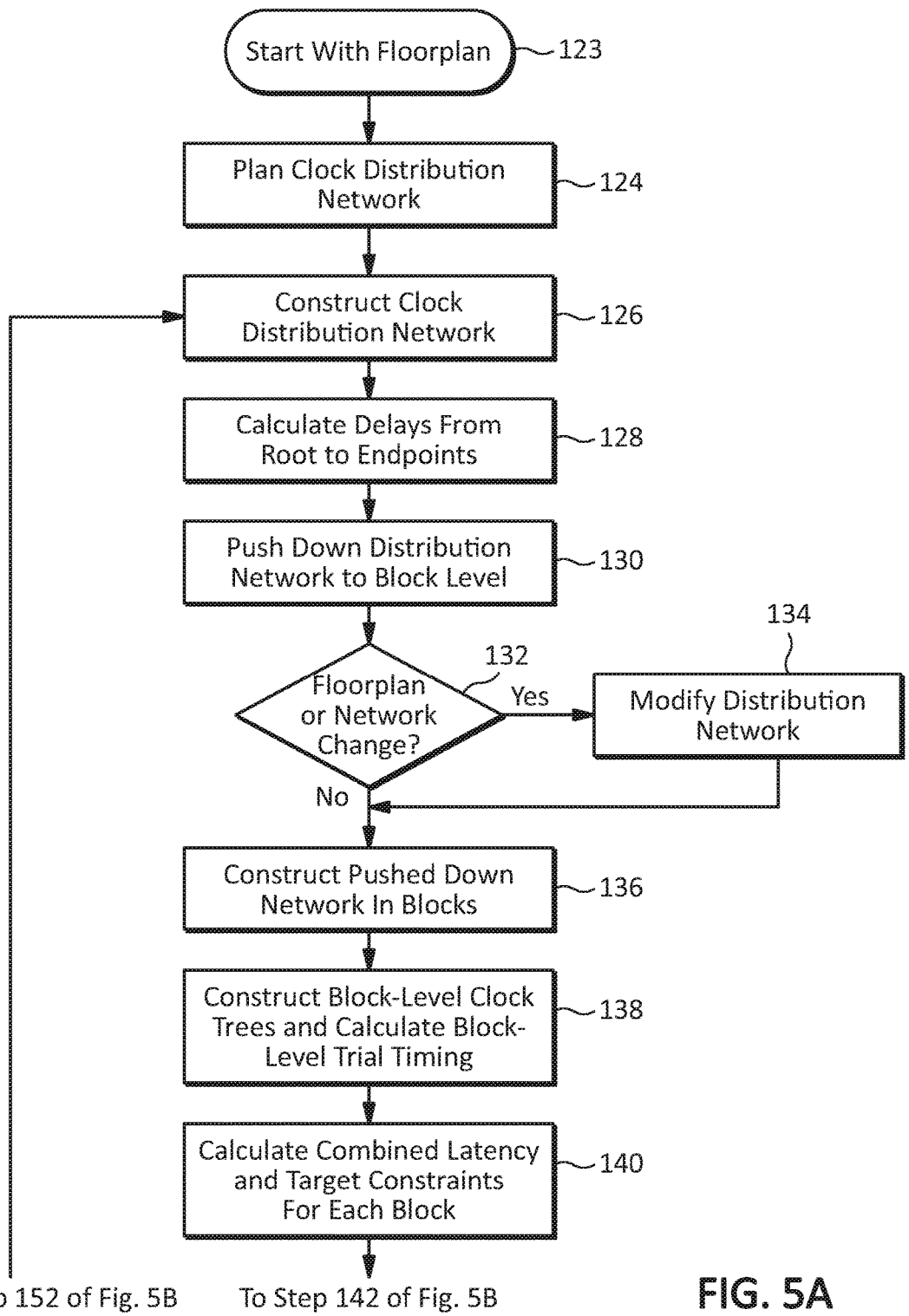
FIGS. 5A and 5B (referred to collectively as FIG. 5) taken together form a flow chart illustrating an example embodiment of a method for constructing a hierarchical clock tree for an integrated circuit according to this disclosure.
Figure 5B:
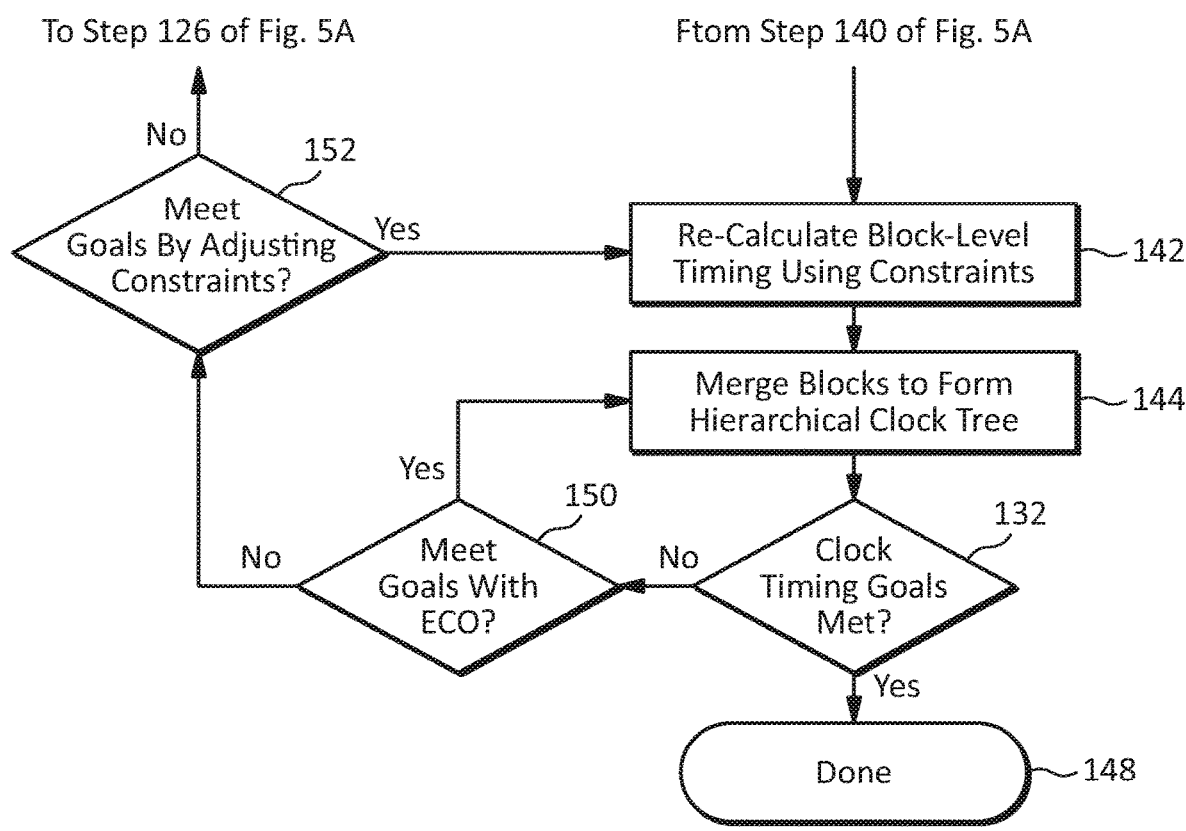
Figure 6:
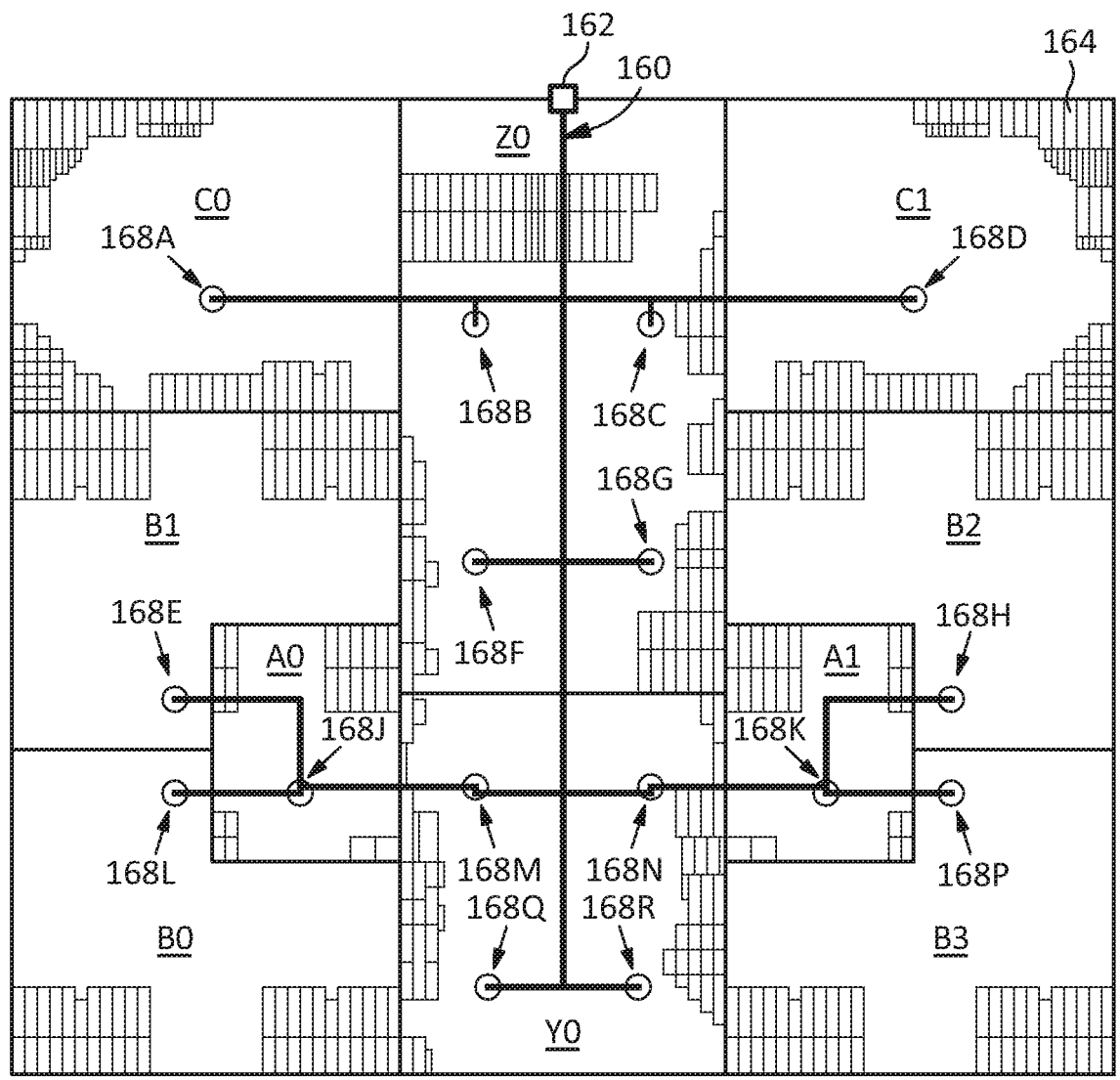
FIG. 6 is a plan view illustrating an embodiment of a clock distribution network constructed according to a method for constructing a hierarchical clock tree for an integrated circuit according to this disclosure.

Referring to FIG. 5 (which is formed collectively by FIGS. 5A and 5B), the method may begin at step 123 where a designer may start with a floorplan having blocks that have been placed during the placement phase of the physical design process. At step 124, the designer may plan a top-level clock distribution network which may include all of the structures required to distribute a source clock signal to all of the blocks. FIG. 6 illustrates the exemplary block layout. In this example, blocks Z0 and Y0 are single-instance blocks, while blocks A0 and A1, C0 and C1, and B0-B3 are sets of multiple-instantiated blocks (MIBs). By way of example, all of the MIBs may have block-level clock trees implemented with CTS starting at the single endpoint buffer in each block, which may be referred to as CTS root buffers. Also by way of example, blocks Z0 and Y0 may use multisource CTS (MSCTS) where each of the four endpoint buffers in each block maybe one of the multiple tap points used for MSCTS in that block. The fine structures 164 located around the peripheries of the blocks and/or sub-blocks may be macro cells that may be placed before any standard cells in the remaining area of each block or subblock. The macro cells may be placed first because they may have a taller profile than standard cells.

Although this step may be automated, in this embodiment, the designer may plan and construct the top-level clock distribution network manually which may be accomplished independently of the EDA tools used for the design, and which may provide the designer with a full-chip view of the hierarchical clock tree. This may reduce the number of design iterations and result in faster closure.

At step 126, the designer may construct the top-level clock distribution network, for example, based on a configuration file which may specify the topology of the clock distribution network. At this point in the design process, clock buffers may be placed at illegal locations because the routes may only be topological and routing may not be completed to the buffer terminals.

The word terminal may be used to refer to a physical connection, including a physical locations and/or shape of a physical connection. The word port may be used to refer to a logical connection. The word pin may be used to refer to a terminal or a port interchangeably depending on context.

FIG. 6 illustrates the placement of the clock distribution network 160 which may start at a clock root 162 and may have a spines branching out to endpoints indicated by circles 168A through 168B which are not part of the design. For simplicity of illustration, only the wiring of the clock distribution network 160 is shown, but it may also include buffers, gates and any other clock cells located at suitable points in the network.

Figure 7:
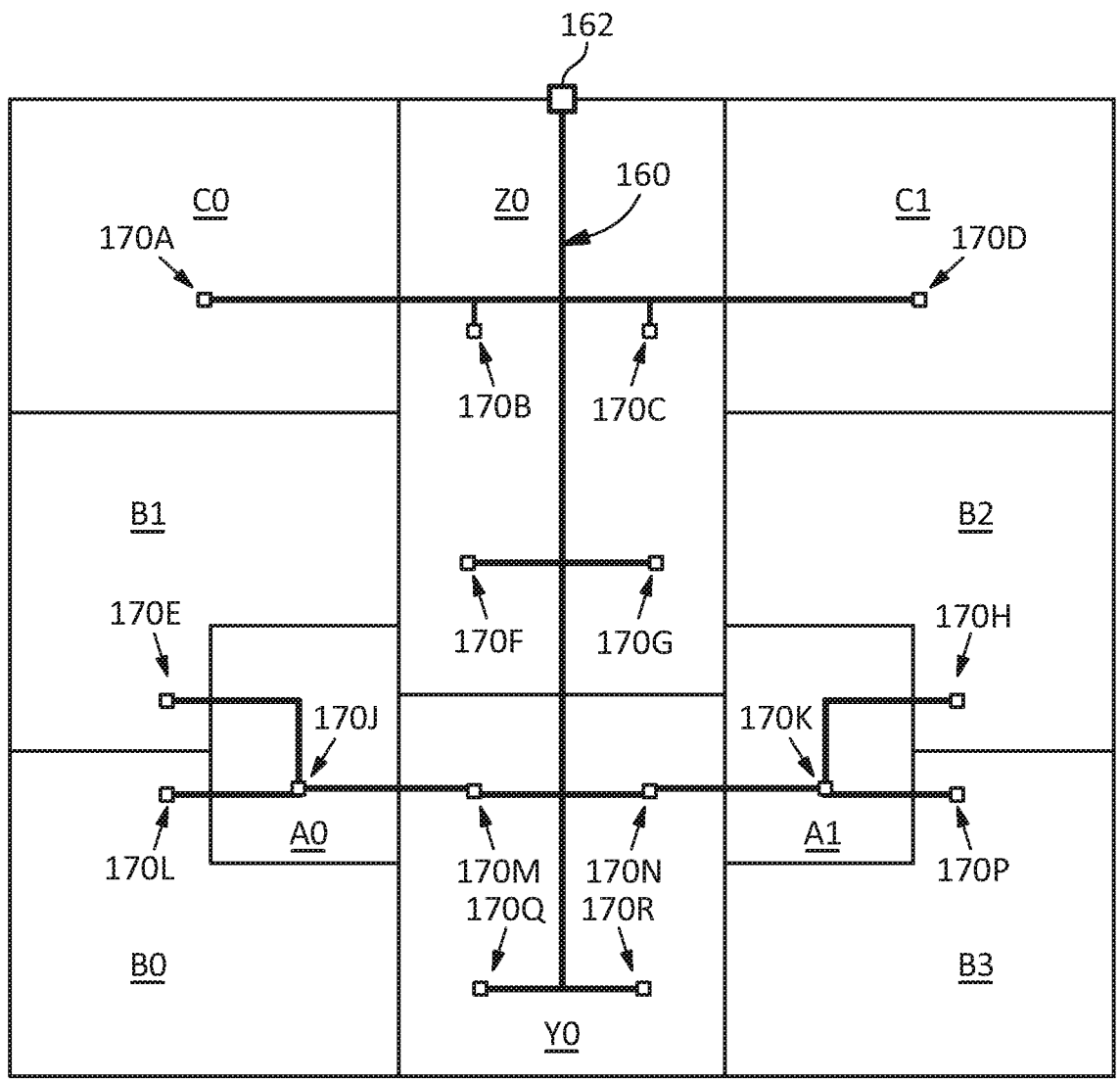
FIG. 7 is a plan view illustrating dummy loads added to the clock distribution network of FIG. 6 for calculating clock timing according to a method for constructing a hierarchical clock tree for an integrated circuit according to this disclosure.

At step 128, a single dummy flip-flop or other sequential logic load 170A, 170B, etc., which may be referred to collectively as 170, may added at each endpoint as shown in FIG. 7 to enable the EDA tool(s) to calculate the insertion delay from the clock root 162 to each endpoint. The insertion delays may be calculated for all relevant process, voltage and temperature (PVT) corners to find the maximum insertion delay to each endpoint at each PVT corner. These calculated latency values for each subblock may be saved for use in step 140 where they may be used to calculate the overall latency for each subblock. For simplicity, the fine structures 164 have been omitted from FIG. 7.

Figure 8:
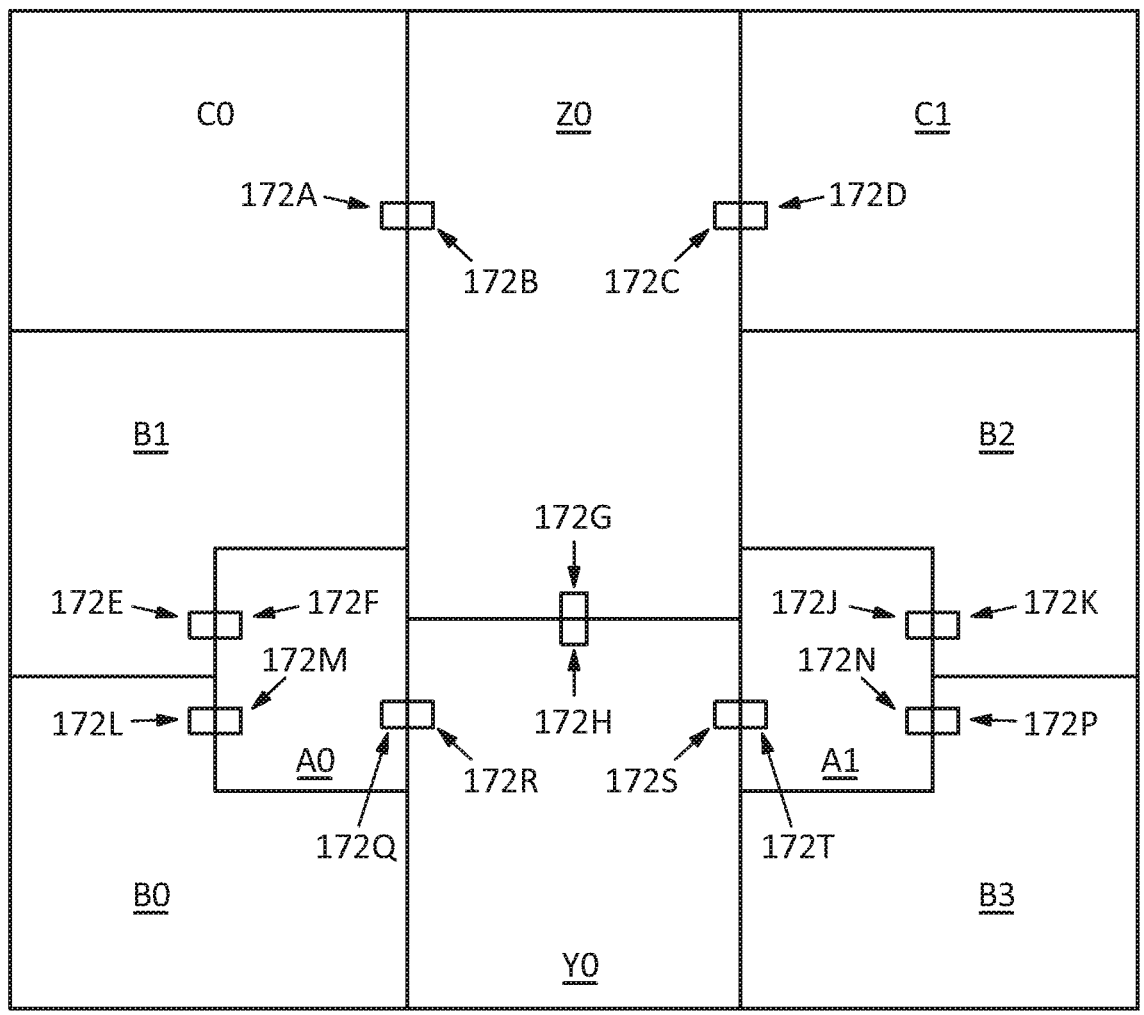
FIG. 8 is a plan view illustrating abutted clock terminals added to the clock distribution network of FIG. 6 according to a method for constructing a hierarchical clock tree for an integrated circuit according to this disclosure.

At step 130, the top-level clock distribution network, including the routes and clock buffers, may be pushed down to the blocks and subblocks, including multiple-instantiated blocks which may be handled correctly. The top-level and block-level connectivity may be modified as necessary, and pairs of abutting block terminals 172A, 172B, etc. . . . , which may be referred to collectively as 172, including feedthroughs, may be created at each location where a route of the clock distribution network passes between abutting blocks as shown in FIG. 8. For simplicity, the fine structures 164 have been omitted from FIG. 8. During push-down, a subblock configuration file may be created for each subblock. An engineering change order (EGO) file may also be created for each subblock. For multiple-instantiated blocks, a configuration file and/or EGO file may only be created for the master instance which may be determined, for example, by the top-level floorplan designer. This may capture the locations at which the buffers are placed as well as the topology of the routes. Placement and routing blockages may be generated to block the legal locations at which the buffers are placed. The EGO files and configuration files may provide two separate or complementary methods to implement a push down. Moreover, the top-level and/or block level configuration files may provide a unique way for a designer to construct the clock distribution network and/or hierarchical clock tree.

At step 132, if the push down has resulted in a floorplan change for any block or subblock which may require a change to the pushed-down clock distribution network, the method may proceed to step 134. Also, if any subblock may need to change the pushed-down clock distribution network to meet a new top-level and/or block-level latency and/or skew goal, the method may proceed to step 134. Otherwise, the method may proceed to step 136.

At step 134, the pushed-down clock distribution network may be modified, including routes and/or cells, to meet the new latency and/or skew goal.

Figure 9:
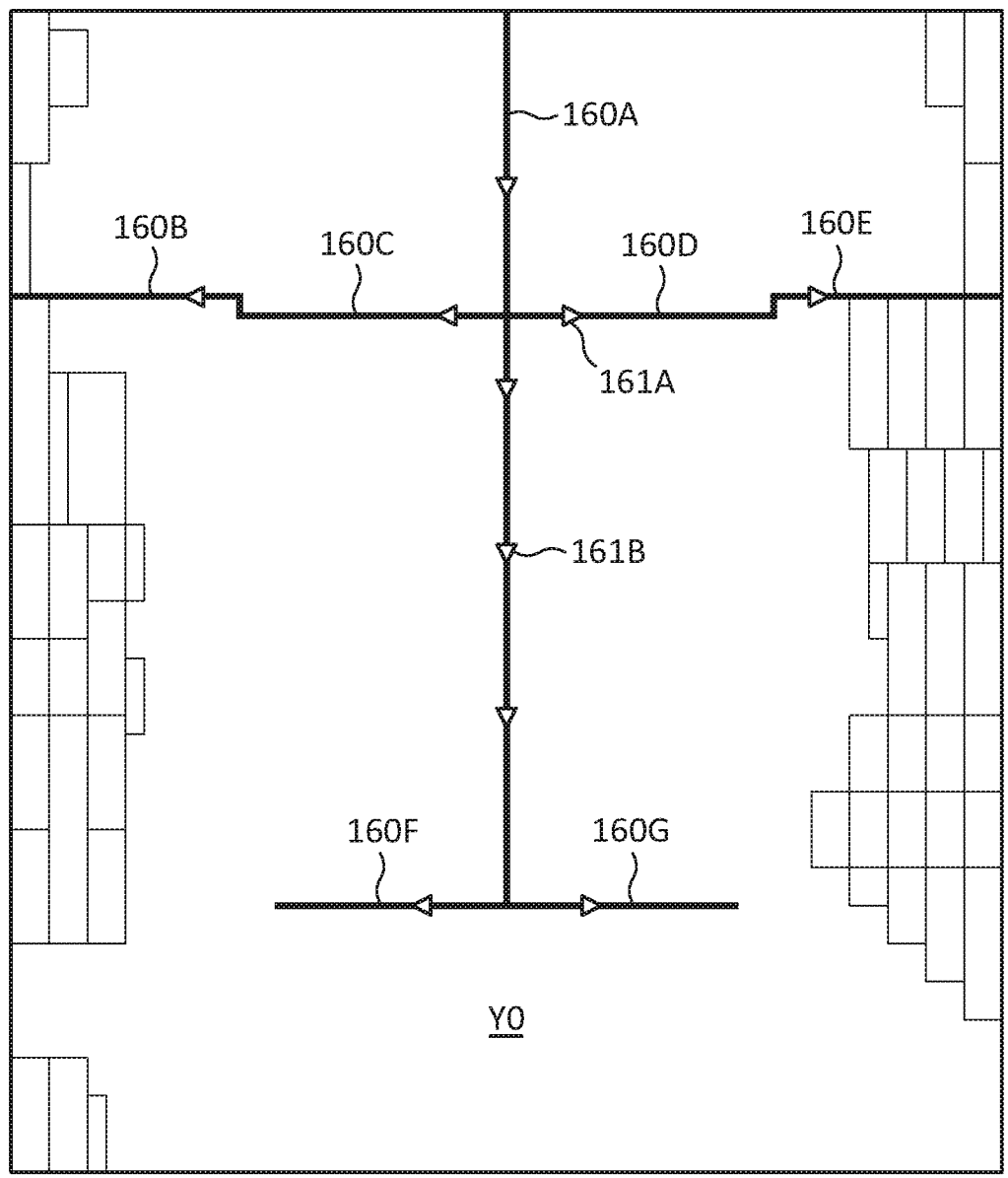
FIG. 9 is a plan view illustrating pushed down clock cells and clock spine segments in an enlarged portion of FIG. 6 according to a method for constructing a hierarchical clock tree for an integrated circuit according to this disclosure.

At step 136, construction of the entire hierarchical clock tree may begin based on the combined configuration files generated by the push down. For each block, the portion of the top-level clock distribution network in that block may constructed at the block level, with the route topology and buffer placement of that portion of the top-level clock distribution network being recreated. The recreation may be substantially exact depending on the implementation details. At this step, the routes may also be completed to the terminals of the buffers in the top-level clock distribution network. The clock piers and flip-flops may be reordered using each of the distribution endpoints with techniques such as clock gater merging and splitting. FIG. 9 illustrates an example embodiment of what the pushed down clock cells and clock spine segments 160A through 160G may look like for block Y0. By way of example, a few of the clock buffer cells are indicated as 161A and 161B.

At step 138, a clock tree for each block or subblock may be constructed, and the insertion delay for each block or subblock may be calculated starting from the endpoint of the clock distribution network. This may be characterized as calculating block-level trial timing. In this example embodiment, clock tree synthesis (CTS) may be used, but any other suitable technique may be used to calculate or measure the insertion delay for each block or subblock. As an example, a clock mesh structure and accompanying timing analysis may be used for some or all of the block-level clock trees.

At step 140, the overall or combined latency starting from the top-level clock root may be calculated for each block or subblock. This may be accomplished by summing the insertion delay from the clock root 162 to each endpoint, which was calculated in step 128, with the insertion delay for the corresponding block or subblock, which was calculated in step 138. The block or subblock having the longest overall insertion delay of all the blocks or subblocks may then be identified. For all the other blocks, the insertion delay for each block or subblock may be subtracted from the longest overall insertion delay, and the result of the subtraction may be used as the clock latency target for that block. Thus, the block-level CTS target constraints may be derived from the top-level clock distribution network and the block-level CTS trial results. The clock latency target for each block may be used as a clock insertion delay constraint for step 142.

At step 142, the insertion delay for each block or subblock may be re-calculated using the insertion delay constraints calculated in step 140.

In some embodiments, steps 138 through 142 may be collectively referred to as an example of implementing partition clock trees, for example, as disclosed in step 106 of FIG. 1.

At step 144 of FIG. 5, the blocks and/or subblocks may be merged to form a complete top-to-bottom hierarchical clock tree structure along with a merged database with the insertion delay for each block or subblock that has been re-calculated in step 142 using the insertion delay constraints from step 140. The overall latency starting from the top-level clock root may then be re-calculated for each block or subblock using the latency data from the merged data base. The latency may be evaluated at one or more corners including any or all relevant process, voltage and temperature (PVT) corners.

At step 146, the re-calculated latencies for each block or subblock may be checked against design goals for skew and/or latency. If the goals are met, the method may terminate at step 148. All or any portion of the overall hierarchical clock tree, including routes, buffers and/or clock cells may then be preserved, for example, by locking them down to prevent EDA tools from modifying all or any portion of the overall hierarchical clock tree during implementation of the partitions.

If the design goals are not met at step 146, the method may proceed to step 150 where one or more ECOs may be used to make minor changes to one or more blocks or subblocks. The blocks and/or subblocks may then be re-merged at step 144 and re-checked at step 146. The method may proceed through the loop of steps 150, 144 and 146 one or more times attempting to achieve the clock timing goals.

At step 150, if it is determined that the skew and/or latency goals may not be met with ECOs, the method may proceed to step 152 where one or more of the insertion delay constraints for one or more of the blocks and/or subblocks may be adjusted. The method may then return to step 142 where the insertion delay for one or more blocks or sub-blocks may be re-calculated using the one or more adjusted insertion delay constraints from step 152. The method may proceed through the loop of steps 152, 142, 144, 146, and 150 one or more times attempting to achieve the clock timing goals. The method may also go back-and-forth between the inner block-level loop of step 150 and the outer block-level loop of step 152.

At step 150, if it is determined that the skew and/or latency goals may not be met by adjusting insertion delay constraints for one or more of the blocks and/or subblocks, the method may proceed to step 126 where the designer, which throughout this disclosure may also include an automated process in some embodiments, may re-plan and/or re-construct the top-level clock distribution tree, but this time with the benefit of the knowledge gained from going through the main flow of the method of FIG. 5.

As the method proceeds through the steps of FIG. 5, a designer may gain a progressively better chip-level, or multi-level view and understanding of the entire hierarchical clock tree that may be unavailable with conventional EDA tools. By the time the method reaches step 146, the designer may not only have a deep understanding of the timing behavior of the entire hierarchical clock tree, but the designer may also have the benefit of the ECO and constraint-based adjustment processes which may enable the designer to rapidly adjust the clock timing at the block level and may result in faster timing closure, as well as lower overall power consumption and smaller design area. Even if the designer returns to step 126 to re-plan and/or re-construct the top-level clock distribution tree, the designer may typically be able to quickly make adjustments to the clock distribution tree that results in meeting the timing design goals with little or no adjustment needed at the block level. Moreover, the decoupling of the dependencies between the top-level clock distribution tree and the block-level clock trees may enable the top-level and block-level balance work to proceed in parallel. Additionally, because the designer may be able balance the entire hierarchical clock tree using ECOs and/or budgeting/adjustment at the block-level, in some embodiments and/or circumstances, the top-level clock distribution tree may not need any balancing, which may reduce or minimize the top-level latency.

Regardless of the path taken through the method of FIG. 5, once the clock timing goals are met at step 132, the method may terminate at step 148. All or any portion of the overall hierarchical clock tree, including routes, buffers and/or clock cells may then be preserved, for example, by locking them down to prevent EDA tools from modifying all or any portion of the overall hierarchical clock tree during implementation of the partitions.

Referring to FIG. 6, the fine structures 164 located around the peripheries of the blocks and/or subblocks may be macro cells that may be placed before any standard cells in the remaining area of each block or subblock. The macro cells may be placed first because they may have a taller profile than standard cells. In some embodiments, it may be beneficial or necessary to avoid placement of clock cells such as buffers, gates, etc., for the clock distribution network in locations occupied by the memory cells. However, even though components and wiring within clock cells may be placed and routed in lower layers of the integrated circuit, it may be possible to route much of the wiring between cells for the clock distribution network through higher layers of the integrated circuit. This may reduce resistance, capacitance, and/or other potentially adverse characteristics of the wiring because the wiring at higher layers may have thicker conductors and greater spacing between conductors.

In some additional embodiments, a hierarchical clock tree may be built from the bottom up. With this approach, a top-level clock designer may convert an entire hierarchical clock tree structure including all clock cell locations and routes into each block level. The clock ports may be aligned and the clock latency may be calculated by adding insertion delays from each block or subblock. This may be accomplished, for example, through manual calculations and/or scripting. In other additional embodiments, buffers may be placed and/or sized automatically based, for example, on information about timing per unit length, metal information, etc., which may be provided, for example by a look-up table or other source.

In addition to those mentioned above, and depending on the implementation details and circumstances, the principles of this disclosure may provide any or all of the following benefits and/or features: faster timing closure for the entire design, especially at interfaces between MIM and non-MIM blocks; easy latency and skew control for the entire hierarchical clock tree design; overall better clock tree for lower power, low latency and skew; independence from the integrated circuit technology; support for any number of blocks and/or subblocks; support for any floorplan including rectilinear floorplan shapes and abutting sub-blocks; support for any user specified non-default routing rule for clock nets; support for any regular standard cell clock driver or custom clock cells; support for multiple clocks; support for multiple levels of hierarchy, including pushing one or more levels down at a time; support for abutted designs which may save project execution time and design area compared to non-abutted design where top-level balancing work may have to wait until all sub-blocks are completed; support for CTS for sub-blocks which may save design time and/or resources and reduce power consumption and/or design area compared to clock mesh; reduced tape out closure time; and/or tighter control of clock timing as well as flexibility of clock distribution and implementation. In some embodiments, some of the principles of this disclosure may provide top-down hierarchical clock balancing and bottom-up clock network adjustment.

Figure 10:
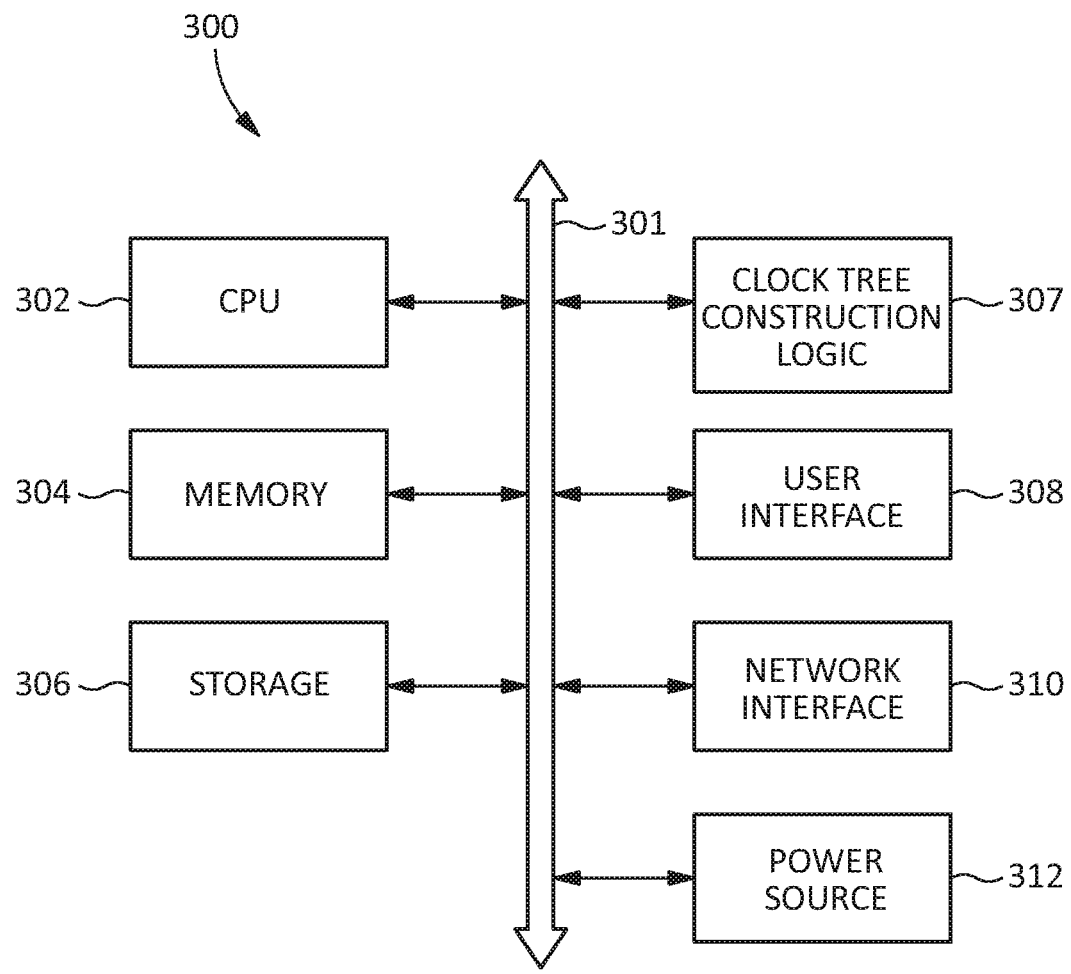
FIG. 10 illustrates an embodiment of a computing system according to this disclosure.

FIG. 10 illustrates an embodiment of a computing system according to this disclosure. The system 300 of FIG. 10 may be used to implement any or all of the methods and/or apparatus described in this disclosure. The system 300 may include a central processing unit (CPU) 302, memory 304, storage 306, user interface 308, network interface 310, and power source 312. Clock Tree Construction Logic 307 may include logic to implement any of the features described in this disclosure including constructing a clock distribution network, pushing a network to a different level, implementing partition clock trees, making ECOs, calculating timing, etc. In different embodiments, the system may omit any of these components or may include duplicates, or any additional numbers of, any of the components, as well as any other types of components to implement any of the methods and/or apparatus described in this disclosure.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc. as well as any virtualized or remote versions of such devices. The network interface 310 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc. The power source 312 may include a battery and/or a power supply capable of receiving power from an AC or DC power source and converting it to any form suitable for use by the components of system 300.

Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any of the all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The blocks or steps of a method or algorithm and functions described in connection with the embodiments disclosed herein may be embodied directly in hardware, in a software module executed by a processor, or in a combination of the two, including in the system 300. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium.

The use of terms such as "first" and "second" in this disclosure and the claims may only be for purposes of distinguishing the things they modify and may not to indicate any spatial or temporal order unless apparent otherwise from context.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of constructing a hierarchical clock tree for an integrated circuit, the method comprising:
    constructing a clock distribution network on a first level;
    pushing the clock distribution network to a second level;
    implementing partition clock trees in partitions on the second level; and
    calculating combined timing of the clock distribution network and the partition clock trees on the second level;
    wherein the first level comprises a first design level, and the second level comprises a second design level;
    wherein the partitions comprise a first block and a second block abutting the first block; and
    wherein pushing the clock distribution network to the second level comprises creating abutting block terminals at a location where a route of the clock distribution network passes between the first block and the second block.

2. A method of constructing a hierarchical clock tree for an integrated circuit, the method comprising:
    constructing a clock distribution network on a first level;
    pushing the clock distribution network to a second level;
    implementing partition clock trees in partitions on the second level; and
    calculating combined timing of the clock distribution network and the partition clock trees on the second level;
    wherein implementing the partition clock trees comprises:
        constructing the partition clock trees in the partitions on the second level;
        calculating trial timing for the partition clock trees;
        calculating target timing constraints for the partition clock trees based on timing of the clock distribution network and the trial timing for the partition clock trees; and
        adjusting the timing of one or more of the partition clock trees based on the target timing constraints.

3. The method of claim 1, wherein calculating the combined timing of the clock distribution network and the partition clock trees on the second level comprises merging the partition clock trees.

4. The method of claim 1, further comprising adjusting the timing of one or more of the partition clock trees on the second level.

5. The method of claim 4, wherein the timing of one or more of the partition clock trees on the second level is adjusted through engineering change orders (ECO).

6. The method of claim 4, wherein the timing of one or more of the partition clock trees is adjusted by adjusting one or more target constraints for the one or more of the partition clock trees on the second level.

7. The method of claim 4, further comprising:
    determining that timing goals are not met by adjusting the timing of one or more of the partition clock trees; and
    adjusting the clock tree distribution network.

8. The method of claim 1 further comprising balancing the clock distribution network in parallel with balancing one or more of the partition clock trees.

9. The method of claim 1, wherein the clock distribution network is pushed into one or more of the partitions on the second level.

* * * * *